United States Patent
Stringham

(10) Patent No.: US 8,200,637 B1
(45) Date of Patent: Jun. 12, 2012

(54) BLOCK-BASED SPARSE BACKUP IMAGES OF FILE SYSTEM VOLUMES

(75) Inventor: Russell R. Stringham, Orem, UT (US)

(73) Assignee: Symantec Operating Corporation, Mountain View, CA (US)

( * ) Notice: Subject to any disclaimer, the term of this patent is extended or adjusted under 35 U.S.C. 154(b) by 421 days.

(21) Appl. No.: 12/241,151

(22) Filed: Sep. 30, 2008

(51) Int. Cl.
*G06F 12/00* (2006.01)

(52) U.S. Cl. ........................................ 707/670

(58) Field of Classification Search .................. None
See application file for complete search history.

(56) References Cited

U.S. PATENT DOCUMENTS

| | | | |
|---|---|---|---|
| 6,487,561 B1 * | 11/2002 | Ofek et al. | 1/1 |
| 7,519,858 B2 | 4/2009 | Korlepara | |
| 7,536,424 B2 | 5/2009 | Barzilai | |
| 7,555,620 B1 * | 6/2009 | Manley | 711/162 |
| 7,587,431 B1 | 9/2009 | Rao | |
| 7,594,085 B1 | 9/2009 | Rao | |
| 7,627,727 B1 | 12/2009 | Kekre | |
| 7,689,609 B2 | 3/2010 | Lango | |
| 7,694,086 B1 | 4/2010 | Bezbaruah | |
| 7,739,464 B1 * | 6/2010 | Coulter et al. | 711/162 |
| 7,743,028 B1 * | 6/2010 | Stringham et al. | 707/646 |
| 2003/0028765 A1 * | 2/2003 | Cromer et al. | 713/164 |
| 2006/0271601 A1 * | 11/2006 | Fatula et al. | 707/201 |
| 2007/0226436 A1 * | 9/2007 | Cheng et al. | 711/162 |

\* cited by examiner

*Primary Examiner* — Neveen Abel Jalil
*Assistant Examiner* — Kellye Buckingham
(74) *Attorney, Agent, or Firm* — Meyertons, Hood, Kivlin, Kowert & Goetzel, P.C.

(57) ABSTRACT

A system and method for creating a backup image from a volume including a plurality of files are described. Information specifying a subset of the files, but not all of the files, to backup may be received. The volume may include a plurality of blocks, where the plurality of blocks includes a respective set of data blocks for each file of the volume and blocks of file system metadata structures for the volume. The method may comprise identifying a subset of, but not all of, the plurality of blocks to copy into the backup image. The subset of blocks may include each data block for each file of the subset of files, and may also include blocks of one or more file system metadata structures needed for accessing the subset of files. The method may further comprise copying each block of the subset of blocks into the backup image. In some embodiments the subset of blocks may be copied into the backup image without copying data blocks for files not in the specified subset of files.

15 Claims, 8 Drawing Sheets

BLOCK-BASED SPARSE BACKUP IMAGES OF FILE SYSTEM VOLUMES

BACKGROUND OF THE INVENTION

1. Field of the Invention

This invention relates to data backup software for computer systems. More particularly, the invention relates to a system and method for creating a block-based backup image that includes only a subset of the files of a file system volume.

2. Description of the Related Art

Computer systems typically use data organized in a file system volume in the form of files, e.g., where the files are stored on a disk drive or other storage device. Backup software is often used to backup the volume in order to protect the data against hardware failure, accidental deletion, or data corruption. The backup software may use different types of backup techniques. According to one general type of backup technique, the backup software may operate at the file level to backup the volume by individually backing up each file in the volume on a file-by-file basis. If the files in the volume are backed up on a file-by-file basis then the metadata in the original volume is typically not backed up. For example, only the file data may be backed up, not the metadata used by the file system to manage the files.

According to another general type of backup technique, the backup software may operate at the block (e.g., sector) level by creating a block-based backup image of the volume. When creating a block-based backup image, the backup software typically traverses the disk drive and copies the entire volume into the backup image on a sector-by-sector basis. The resulting backup image includes both the data for the files in the volume and the metadata used by the file system to manage the files. The backup image can be used to completely restore the volume at a subsequent time such that the file data and metadata in the restored volume are arranged on the disk identically as they were in the original volume.

Some backup software is operable to create different types of block-based backup images, such as full backup images (also referred to as base backup images) and incremental backup images. A full backup image is independent of other backup images and includes all the data of the volume. Thus, a full backup is a complete representation of the volume as it exists at the time the full backup image is created. An incremental backup image includes only the data blocks that have changed (as well as blocks for associated file system metadata structures) since a previous backup image was created. Thus, the incremental backup image is based on the previous backup image, which may be either a full backup image or another incremental backup image.

Block-based backup images are typically used to backup all of the files in the volume. For example, a full backup image typically includes all of the data blocks for all of the files, and an incremental backup image typically includes all the changed data blocks for all of the files that have changed since the previous backup image was created.

SUMMARY

Various embodiments of a system and method for creating a backup image from a volume including a plurality of files are described herein. According to some embodiments of the method, information specifying a subset of the files, but not all of the files, to backup may be received. The volume may include a plurality of blocks, where the plurality of blocks includes a respective set of data blocks for each file of the volume and blocks of file system metadata structures for the volume.

The method may further comprise identifying a subset of, but not all of, the plurality of blocks to copy into the backup image. The subset of blocks may include each data block for each file of the subset of files, and may also include blocks of one or more file system metadata structures needed for accessing the subset of files.

The method may further comprise copying each block of the subset of blocks into the backup image. In some embodiments the subset of blocks may be copied into the backup image without copying data blocks for files not in the specified subset of files.

BRIEF DESCRIPTION OF THE DRAWINGS

A better understanding of the invention can be obtained when the following detailed description is considered in conjunction with the following drawings, in which.

Figure 1:
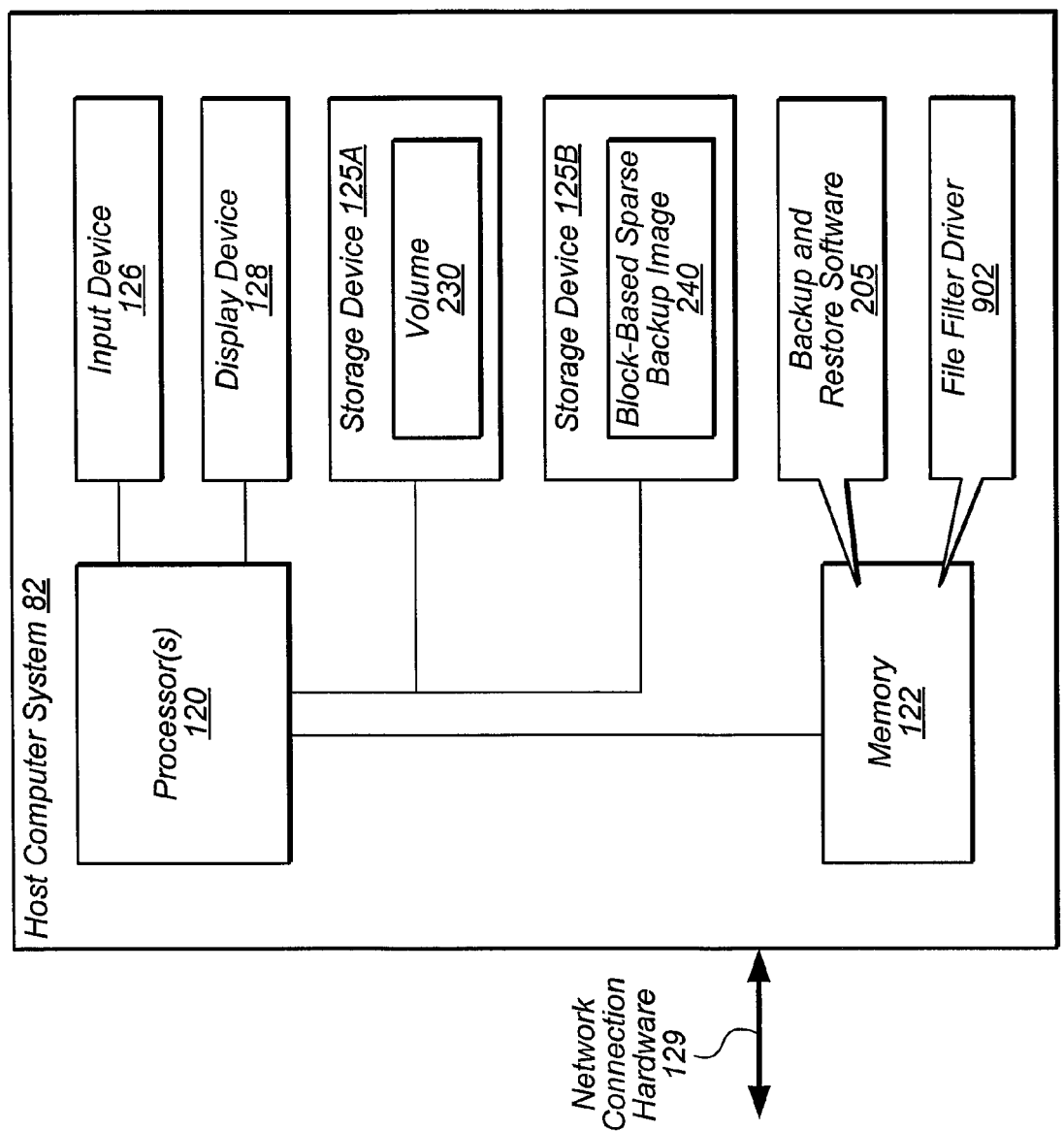
FIG. 1 illustrates one embodiment of a computer system configured to implement a method for creating a block-based sparse backup image.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for creating a backup image from a volume including a plurality of files are described herein. Briefly described, the method comprises receiving information specifying a subset of the files to be backed up, and copying the data blocks for each file of the subset of files into the backup image, as well as blocks of file system metadata structures needed for accessing the subset of files. Data blocks for files of the volume that are not in the specified subset of files may not be copied into the backup image. The resulting backup image is referred to herein as a block-based sparse backup image. Embodiments of a method for mounting a block-based sparse backup image in order to access the files in the subset of files are also described, as well as embodiments of a method for restoring a block-based sparse backup image to a target volume.

FIG. 1 illustrates one embodiment of a computer system 82 configured to implement the methods described herein. It is noted that FIG. 1 is provided as an example, and in other embodiments the host computer system 82 may be implemented in various other ways. In some embodiments the host computer system 82 may comprise a computer such as a personal computer system (PCs), workstation, portable computer (e.g., laptop or notebook), intelligent storage device, television system, or other computing device or combination of devices.

In this example, the host computer system 82 includes one or more processors 120 coupled to memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or data. In particular, the memory 122 may store backup and restore software 205. In some embodiments the memory 122 may also store a file filter driver 902. The processor(s) 120 may execute the backup and recovery software 205 and the file filter driver 902 to perform the functions described herein. For example, the backup and restore software 205 may execute to create a block-based sparse backup image, mount a block-based sparse backup image, and/or restore a block-based sparse backup image to a target volume according to the methods described herein. The file filter driver 902 may execute to filter requests to access a block-based sparse backup image that has been mounted for access, as described in detail below.

In various embodiments the backup and restore software 205 may be implemented in any of various ways and may have any desired software architecture. In some embodiments the backup and restore software 205 may include multiple modules or programs that operate in conjunction to perform the functions described herein. Also, in some embodiments the backup and restore software 205 may utilize or operate in conjunction with various other software executing in the host computer system 82, such as operating system software, file system software, volume manager software, network communication software, etc.

Referring again to FIG. 1, it is noted that the processor 120 is representative of any type of processor. For example, in some embodiments the processor 120 may be compatible with the x86 architecture, while in other embodiments the processor 120 may be compatible with the SPARC™ family of processors. Also, in some embodiments the host computer system 82 may include multiple processors 120.

The host computer system 82 may include or may be coupled to one or more storage devices 125 which store data in a non-volatile manner. For example, a storage device 125A may store a volume 230, and a storage device 125B may store a block-based sparse backup image 240 created from the volume 230. In other embodiments the volume 230 and the block-based sparse backup image 240 may both be stored on a common storage device.

In various embodiments the storage device(s) 125 may be any type of storage devices, may use any kind of storage media, and may be included in or coupled to the host computer system 82 in any of various ways. For example, in some embodiments the storage device(s) 125 may include one or more disk drives. In some embodiments the storage device(s) 125 may include a mass storage device or system. In some embodiments the storage device(s) 125 may be implemented as one or more hard disks configured independently or as a disk storage system. For example, the disk storage system may be an example of a redundant array of inexpensive disks (RAID) system. In an alternative embodiment, the disk storage system may be a disk array, or Just a Bunch Of Disks (JBOD), (used to refer to disks that are not configured according to RAID). In yet other embodiments, the storage device(s) 125 may include tape drives, optical storage devices or RAM disks, for example.

In various embodiments the one or more storage devices 125 may be included in or coupled to the host computer system 82 in any of various ways, such as direct attached storage, fibre channel storage, storage area network (SAN) storage, iSCSI storage, etc. In some embodiments the host computer system 82 may communicate with the one or more storage devices 125 through a network.

The host computer system 82 may also include one or more input devices 126 for receiving user input. The input device(s) 126 may include any of various types of input devices, such as keyboards, keypads, microphones, or pointing devices (e.g., a mouse or trackball). For example, in some embodiments the backup and restore software 205 may provide a user interface that enables a user to input or request a subset of files of the volume 230 which the user desires to backup. The backup and restore software 205 may backup data blocks for the specified files to a block-based sparse backup image without backing up data blocks for other files of the volume 230.

The host computer system 82 may also include one or more output devices 128 for displaying output. The output device(s) 128 may include any of various types of output devices or display devices, such as LCD screens or monitors, CRT monitors, etc. A graphical user interface for the backup and restore software 205 may be displayed on an output device 128.

The host computer system 82 may also include network connection hardware 129. In some embodiments the host computer system 82 may couple through a network to a storage device 125A on which the volume 230 is stored and/or to a storage device 125B on which the block-based sparse backup image 240 is stored. For example, the network may include any type or combination of local area network (LAN), a wide area network (WAN), wireless networks, an Intranet, the Internet, etc. Examples of local area networks include Ethernet networks, Fibre Channel networks, Fiber Distributed Data Interface (FDDI) networks, and token ring networks. Also, the host computer system 82 may be coupled to the network using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

As used herein, the term "volume" refers to data representing a set of files managed by file system software. The files may be organized in a hierarchy of directories or folders. In various embodiments the volume may be structured or implemented in accordance with any of various kinds of files systems. Examples of file systems include File Allocation Table (FAT) file systems (e.g., FAT32, FAT16, etc.); NTFS file systems; EXT2 or EXT3 file systems; Hierarchical File System (HFS) file systems; etc.

The volume data is organized into units referred to as "blocks". Each block has the same number of bytes, referred to as the block size. In various embodiments, the block size may be any number of bytes. In some embodiments the volume is stored on a disk drive, and the block size is the equivalent of the sector size of the disk drive so that each block of the volume is stored on a corresponding sector of the disk drive. A sector may be the smallest addressable unit of data on a disk drive. Some disk drives use a sector size of 512 bytes, although the sector size may differ for different types of disk drives.

The volume data includes both the data of the files and metadata used by the file system to manage and access the files. The data for each file is stored in one or more of the blocks of the volume. For example, if the block size is 512 bytes and the size of a file is 5120 bytes then the file may be stored across 10 blocks, referred to as the data blocks for the file. The data blocks for the file may or may not be stored at contiguous storage locations on the disk drive. For example, in some cases the data blocks for the file may be grouped into multiple groups of blocks that are interspersed with the data blocks for other files.

The volume metadata may include a plurality of metadata structures. Each metadata structure is stored across one or more blocks of the volume. For example, the volume metadata may include a directory structure for each directory of the volume. Each directory structure may include a plurality of entries, where each respective entry corresponds to a respective file in the directory and specifies where the data blocks for the respective file are located, e.g., specifies the addresses or block numbers of the data blocks. The volume metadata may also include other metadata structures used by the file system. Examples of other metadata structures used by some file systems include a master file table (MFT), boot sector, file allocation tables, etc.

In some embodiments one or more of the metadata structures may be implemented as a special type of file referred to herein as a "metadata file". The term "data file" is used herein to refer to any file other than a metadata file.

Figure 2:
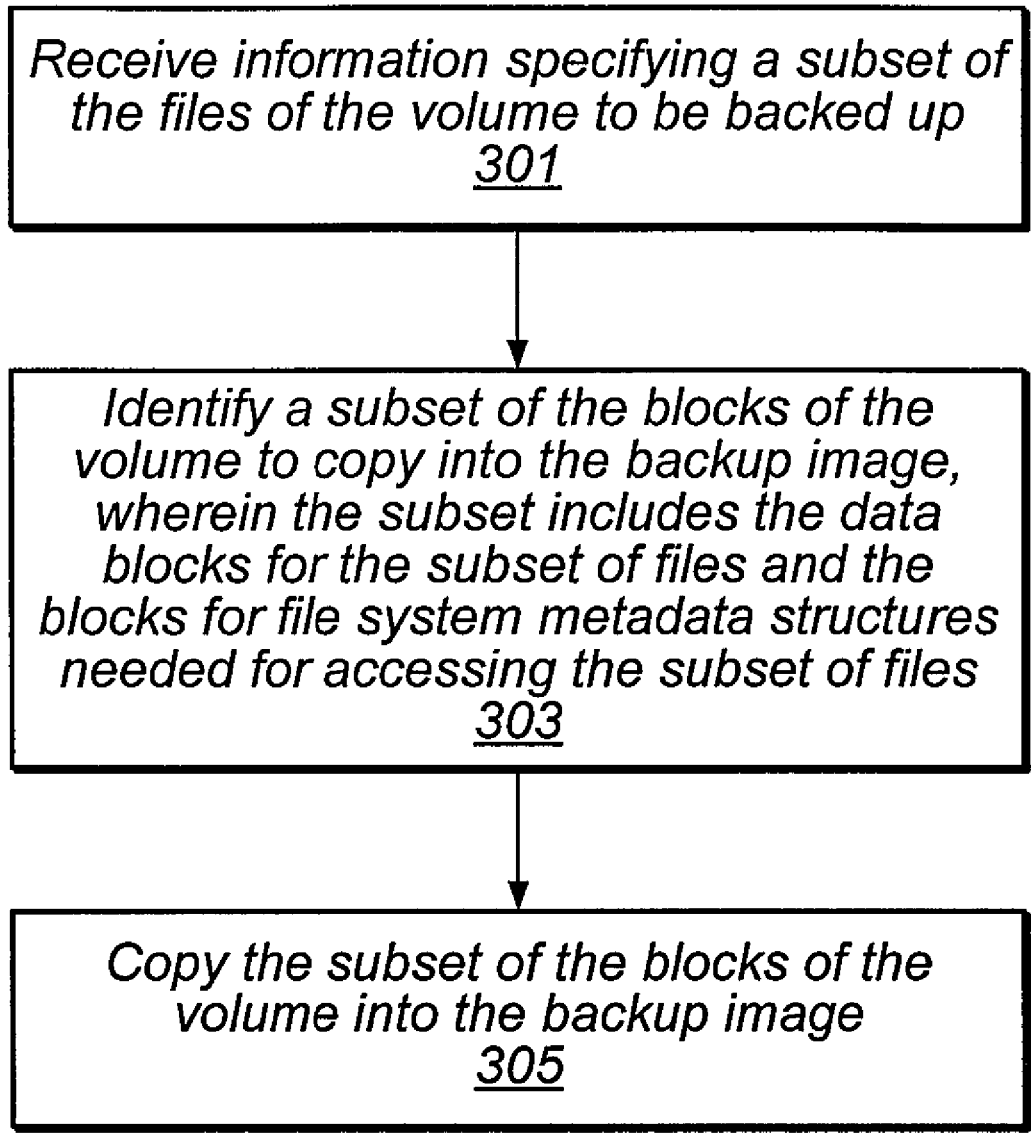
FIG. 2 is a flowchart diagram illustrating one embodiment of the method for creating the block-based sparse backup image.

Referring now to FIG. 2, a flowchart diagram showing one embodiment of a method for creating a backup image, e.g., a block-based sparse backup image, from a volume is illustrated. The method may be implemented by software, e.g., backup and restore software 205 executing on the host computer system 82.

As indicated in 301, the backup and restore software 205 may receive information specifying a subset of the files of the volume to be backed up. For example, the backup and restore software 205 may be operable to display a graphical user interface that enables a user to provide input specifying a subset of files which the user desires to be backed up. In other embodiments the backup and restore software 205 may receive the information specifying the subset of files from another software application or other data source.

A subset of the files of the volume means one or more, but not all, of the files of the volume. The subset of files may be specified in various ways. For example, in some embodiments the user or application may specify or select a list of the desired file names to be backed up. In other embodiments the user or application may specify one or more directories or folders to be backed up. For example, the user may specify a folder such as "C:\documents\" or "My Documents". Specifying a particular directory or folder indicates that all of the files located in the directory or folder should be backed up. In other embodiments the user or application may specify wildcard or naming criteria that indicate names of files to be backed up. Thus, any file that matches the specified criteria will be included in the backup image. For example, if the user specifies criteria of "*.doc" then any file in the volume that has an extension of ".doc" will be included in the backup image.

As indicated in 303, the backup and restore software 205 may identify a subset of the blocks of the volume to copy into the backup image. The subset of blocks may include all of the data blocks for each file of the subset of files specified for backup. The subset of blocks may also include blocks of one or more file system metadata structures needed for accessing the subset of files. For example, for each respective directory that includes one or more of the files specified for backup, the blocks of the directory structure for the respective directory may be identified as blocks that should be copied into the backup image. Also, blocks of the directory structures for ancestor directories (e.g., following the chain of directories back to the root directory) of directories that include files specified for backup may be identified as blocks that should be copied into the backup image. In some embodiments, blocks of other directory structures may also be identified as blocks that should be copied into the backup image. For example, in some embodiments, the blocks of all of the directory structures for all of the directories of the volume may be identified for backup.

The subset of blocks identified for backup may also include blocks of one or more file system metadata structures other than directory structures, e.g., such as the boot sector, file allocation tables, master file table (MFT), etc.

Thus, the subset of blocks of the volume that are identified as blocks to be copied into the backup image may include the data blocks for the subset of files specified for backup, as well as blocks of metadata structures needed by the file system to access the files of the subset of files. For at least one particular data file that is not in the subset of files specified for backup, at least one of the data blocks for the particular data file is not included in the subset of blocks. In some embodiments, none of the data blocks for any of the data files that are not in the subset of files specified for backup are included in the subset of blocks, so that none of the data blocks for any of these data files will be copied into the block-based sparse backup image. Also, in some embodiments, the subset of blocks identified for backup to the block-based sparse backup image may not include the blocks of at least one metadata structure of the volume.

As indicated in 305, the backup and restore software 205 may copy the subset of the blocks of the volume into the block-based sparse backup image. Blocks not in the subset of blocks are not copied into the backup image. In other words, only the blocks identified in 303 as blocks to be copied into the backup image are copied into the backup image.

Figure 3:
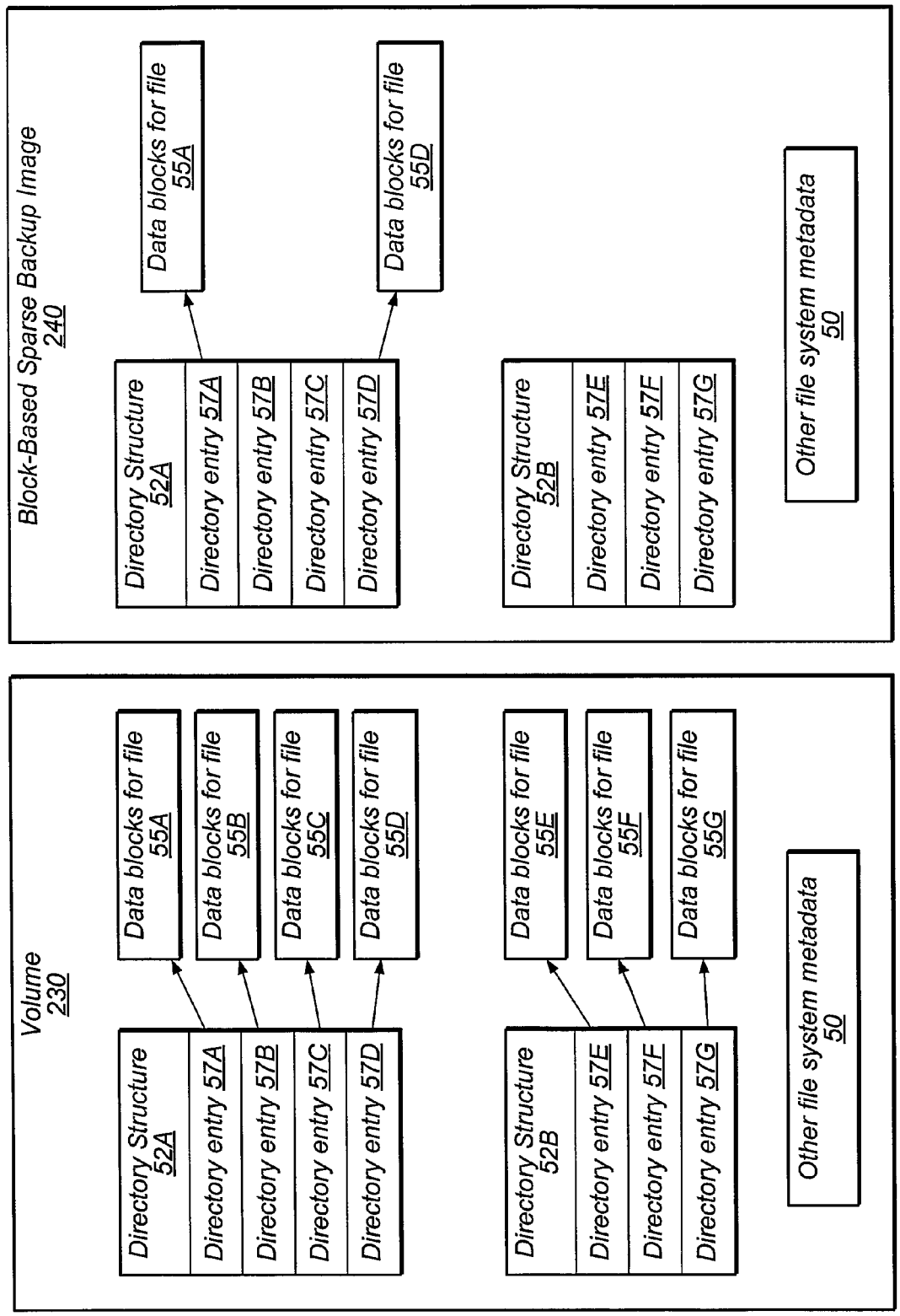
FIG. 3 illustrates an example of a block-based sparse backup image created from a volume.

FIG. 3 illustrates an example of a block-based sparse backup image 240 created from a volume 230. Suppose that the volume includes a directory A which includes four files 55A, 55B, 55C, and 55D. As shown, the directory A is represented by a directory structure 52A which includes four directory entries 57A-D. Each directory entry corresponds to a respective one of the files in the directory A and specifies the location of the data blocks for the respective file. Similarly, a directory B is represented by a directory structure 52B which includes three directory entries 57E-57G corresponding to the three files 55E-55G.

Suppose now that the backup and restore software 205 receives a request to back up only the files 55A and 55B. Thus, the data blocks for the files 55A and 55B may be copied into the block-based sparse backup image 240, as indicated in FIG. 3. However, data blocks for the files 57B, 57C, 57E, 57F, and 57G are not copied into block-based sparse backup image 240 because these files were not in the subset of files specified for backup. In addition to the data blocks for the files 55A and 55B, the blocks of the directory structure 52A have also been copied into the block-based sparse backup image 240. In this example, the complete directory structure 52A has been copied into the block-based sparse backup image 240, including the blocks representing the directory entries 57B and 57C, although the data blocks for the corresponding files 55B and 55C are not copied into the block-based sparse backup image 240. Thus, although the directory structure 52A in the backup image 240 includes directory entries referencing all four of the files in the directory A in the original volume 230, only the directory entries 57A and 57D reference valid data blocks.

In this example, the complete directory structure 52B has been copied into the block-based sparse backup image 240, although none of the data blocks for any of the files in the directory B have been copied into the block-based sparse backup image 240. In other embodiments the directory structure 52B may not be copied into the block-based sparse backup image 240. As illustrated in FIG. 3, the volume 230 also includes file system metadata 50 other than the directory structures 52A and 52B. The blocks of the file system metadata 50 have also been copied into the block-based sparse backup image 240.

In various embodiments the backup and restore software 205 may use various techniques to identify the subset of the blocks of the volume to be copied into the backup image 240. In some embodiments the backup and restore software 205 may execute to store respective information for each respective block of the plurality of blocks of the volume, where the respective information for each respective block indicates whether the respective block should be copied into the backup image. The respective information for each block may be separate information from the information for the other blocks. For example, the respective information for each block may be represented as a separate bit or data structure, such that each block of the volume corresponds to a different bit or data structure. Thus, when copying the blocks into the backup image 240, the backup and restore software 205 may copy each block whose respective information indicates that the block should be copied into the backup image 240 without copying any block whose respective information indicates that the block should not be copied into the backup image 240.

Figure 4:
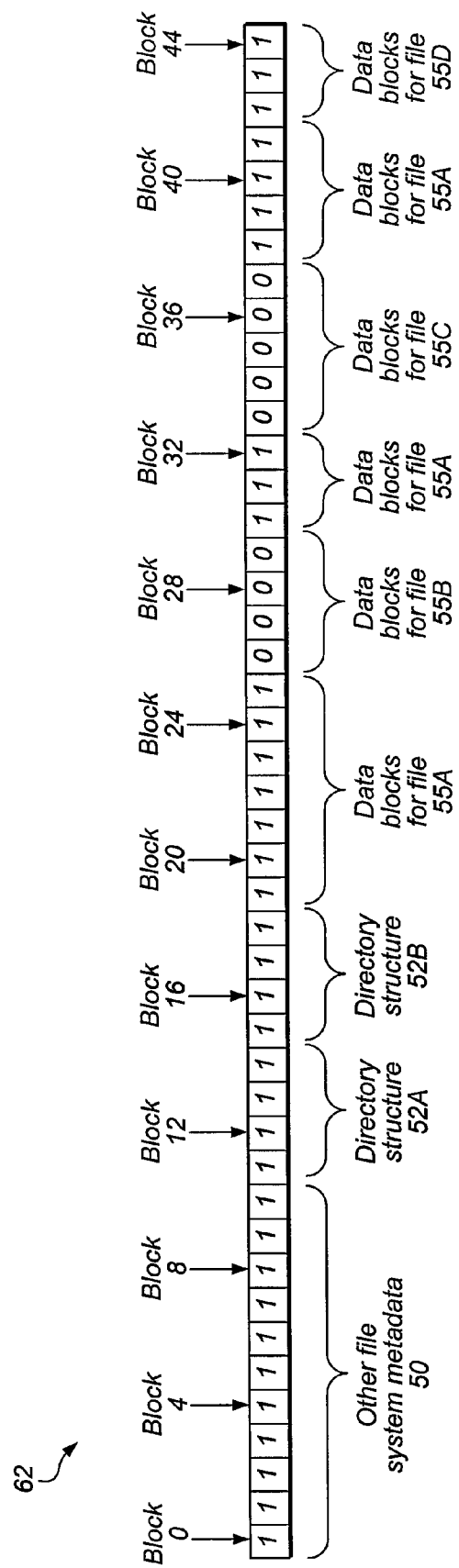
FIG. 4 illustrates an example of a bitmap used to create the block-based sparse backup image of FIG. 3.

In some embodiments storing the respective information for each respective block of the plurality of blocks of the volume may include creating a bitmap which includes a respective bit corresponding to each block of the plurality of blocks. FIG. 4 illustrates an example of a bitmap 62 which corresponds to the example discussed above with reference to FIG. 3. The blocks of the volume 230 are ordered, e.g., according to their storage locations on the disk drive or other storage device. For example, each block may be stored in a respective sector of the disk drive such that the blocks are ordered according to the order of the disk drive sectors. The block numbers illustrated in FIG. 4 reflect the ordering of the blocks on the disk drive, e.g., such that block 0 is followed by block 1, which is followed by block 2, etc. Thus, FIG. 4 illustrates the storage layout of the data of the volume 230. For example, the file system metadata 50 is stored in blocks 0-10; the directory structure 52A is stored in blocks 11-14; the directory structure 52B is stored in blocks 15-18; the data blocks for the file 55A are stored in blocks 19-25, blocks 30-32, 38-41; the data blocks for the file 55B are stored in blocks 26-29; the data blocks for the file 55C are stored in blocks 33-37; and the data blocks for the file 55D are stored in blocks 42-44. (It is noted that the illustrated block numbers and sizes of the volume data structures in FIG. 4 are for illustrative purposes, and the block numbers, data structure sizes, and relative layout of the structures on the disk drive or other storage device may differ in various embodiments.)

Each respective bit of the bitmap 62 is set to a value of either 0 or 1, where a 0 indicates that the block represented by the respective bit should not be copied into the backup image 240, and a 1 indicates that the block represented by the respective bit should be copied into the backup image 240. For example, as discussed above with reference to FIG. 3, the files 55A and 55D have been specified as the only files to be backed up to the block-based sparse backup image 240. Thus, the bits corresponding to the data blocks for the files 55A and 55D have all been set to a value of 1, and the bits corresponding to the data blocks for the files 55B and 55C have all been set to a value of 0. (The data blocks for the files 55E-G are not illustrated in this example, due to lack of space in the drawing, but the bits corresponding to the data blocks for these files would also be set to 0.) The bits corresponding to the blocks of the file system metadata 50 have also been set to 1, as well as the bits corresponding to the blocks of the directory structures 52A and 52B. (As noted above with reference to FIG. 3, in other embodiments the directory structure 52B may not be copied into the backup image 240, in which case the bits for its blocks would be set to 0 instead of 1.)

Thus, the subset of blocks to be copied into the block-based sparse backup image 240 are the blocks whose corresponding bits in the bitmap 62 are set to a value of 1. In some embodiments, when copying the subset of blocks into the backup image 240, the backup and restore software 205 may traverse the blocks of the volume in a single pass, e.g., in the order in which they are stored on the storage device, where each block of the volume is copied into the backup image 240 if its corresponding bit is set to 1 in the bitmap 62. For example, if the volume 230 is stored on a disk drive then the backup and restore software 205 may cause the read/write head of the disk drive to move to the location of the first block (e.g., sector) of the volume and traverse the blocks in order until the last block (e.g., sector) of the volume is reached. As the read/write head passes over each block, the block may be read and copied into the backup image 240 if its corresponding bit in the bitmap 62 is set to 1.

In some embodiments, the backup and restore software 205 may also create a table of contents (TOC) that lists all of the files that are backed up to the sparse backup image 240. For example, if the user specifies that all files having names with naming criteria such as "*.doc" should be included in the sparse backup image then the backup and restore software 205 may need to traverse all the directories in the volume to determine all of the files in the volume that match the naming criteria in order to create the table of contents. In some embodiments the bitmap 62 may be created in conjunction with the table of contents so that it is not necessary to perform a separate traversal of the volume to create the bitmap 62.

In various embodiments the block-based sparse backup image 240 created by the backup and restore software 205 may be formatted or stored in any of various ways. For example, the backup image 240 may be represented as one or more files stored on a target storage device. In some embodiments the backup image 240 may be represented as a single file on the target storage device. In other embodiments the backup image 240 may be represented as information stored in a database on the target storage device.

In some embodiments, additional information other than the subset of data blocks from the original volume may also be included in the backup image 240. For example, in some embodiments the bitmap 62 which specifies the subset of data blocks copied into the backup image 240 may also be included in the backup image 240. As another example, in some embodiments the table of contents listing all the files backed up to the backup image 240 may also be included in the backup image 240. Also, in some embodiments the information or rule set which specified the subset of files to backup from the original volume may also be included in the backup image 240. In addition, the backup and restore software 205 may also include a flag or other information in the backup image 240 which indicates that the backup image 240 is a sparse backup image, e.g., not a complete image of the original volume.

A bitmap such as illustrated in FIG. 4 may be created using various techniques. For example, in some embodiments the file system which manages the volume 230 may provide a capability to generate a system bitmap in which a bit is set to 1 for each block (e.g., sector) of the volume storage area that has been allocated by the file system. Thus, the backup and restore software 205 may obtain a copy of the system bitmap from the file system and then clear the bits corresponding to blocks that do not need to be copied into the backup image 240, e.g., by setting them to 0. For example, the backup and restore software 205 may identify the data files of the volume which were not specified for backup, and may identify the data blocks for these files and clear their corresponding bits in the copy of the system bitmap. In some embodiments the backup and restore software 205 may also clear the bits corresponding to one or more directory structures that are not needed to access the files specified for backup. The bits corresponding to other file system metadata structures may remain set.

In other embodiments the backup and restore software 205 may begin with a clear bitmap (e.g., all bits set to 0) and then set the bits corresponding to blocks that should be copied into the backup image 240. Thus, the data blocks of the files specified for backup may be determined, and the bits that correspond to these data blocks may be set, as well as the bits corresponding to the blocks of directory structures needed to access the files that are backed up, as well as the bits corresponding to the blocks of one or more other file system metadata structures (e.g., boot sector, master file table, file allocation tables, etc.)

Figure 5:
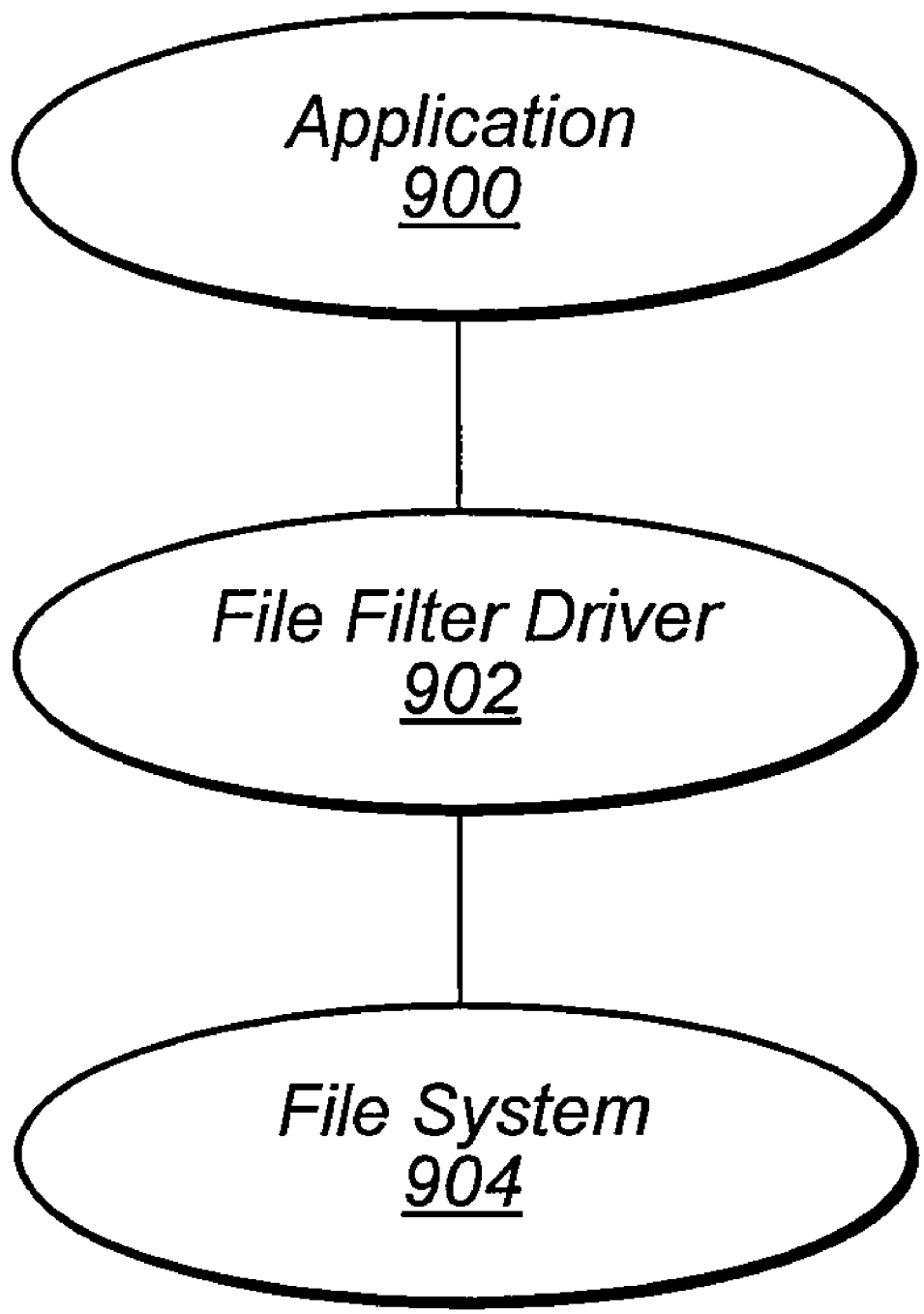
FIG. 5 illustrates a file filter driver which intercepts requests to access files and directories in a block-based sparse backup image.

After a block-based sparse backup image has been created, the backup and restore software 205 or another software application may subsequently need to access the files in the backup image. For example, a user may desire to restore one or more of the files that were backed up, e.g., may desire to restore the files either to the original volume or to another target volume. The backup and restore software 205 may provide a graphical user interface which enables the user to select the backup image, e.g., in order to restore files from the backup image. In response to the user selecting the backup image, the backup and restore software 205 may communicate with the file system software on the host computer 82 to mount the backup image, e.g., in order to enable the files in the backup image to be accessed through the file system. The backup and restore software 205 may also determine that the backup image is a sparse backup image (not a complete image of the original volume), and in response, may communicate with the file system software to install a file filter driver 902. As illustrated in FIG. 5, the file filter driver 902 is a software program or module that acts as an intermediate between a software application 900 (e.g., the backup and restore software 205) and the file system software 904.

Figure 6:
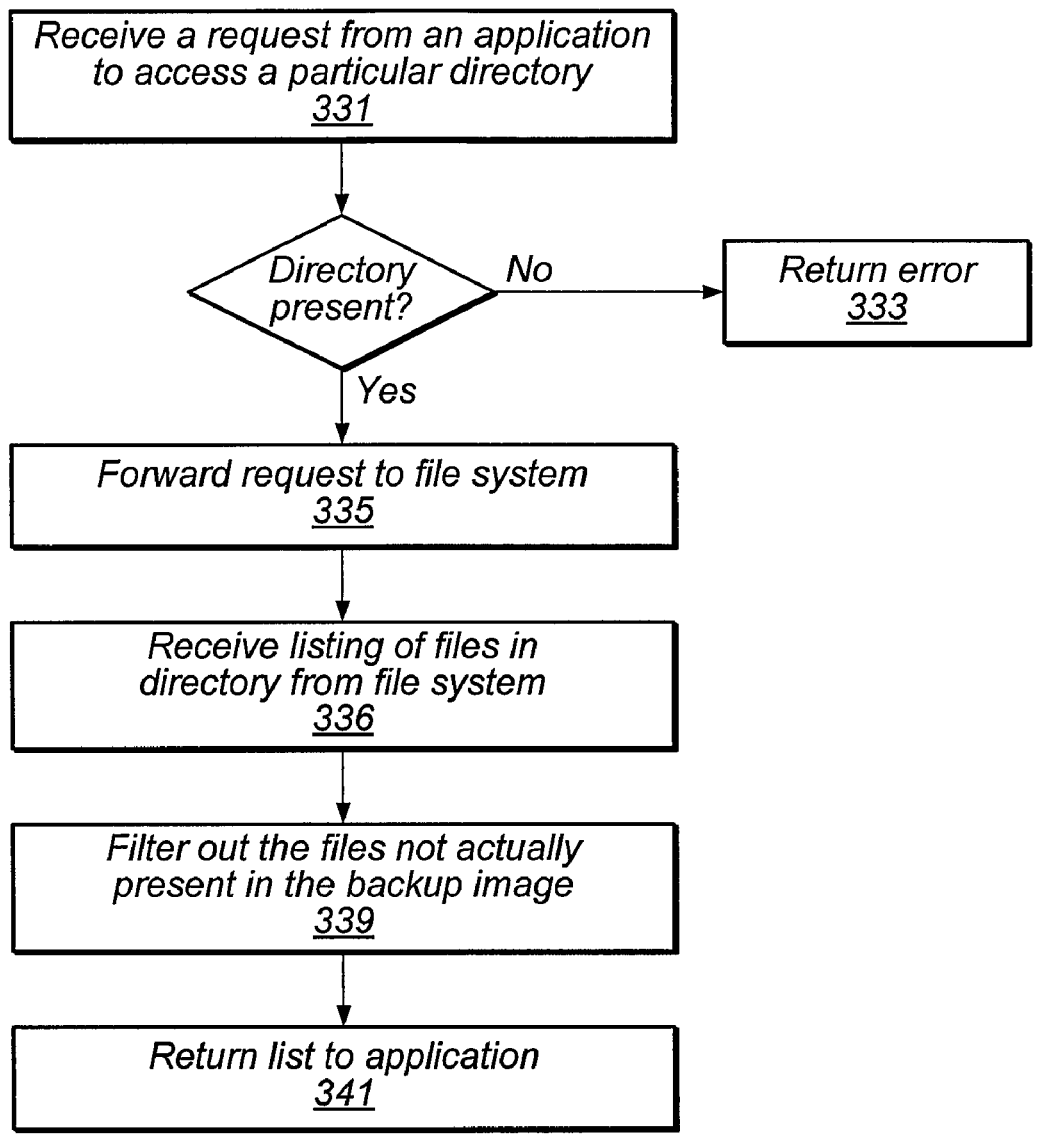
FIG. 6 is a flowchart diagram illustrating a method in which the file filter driver filters out one or more files in a directory listing of a directory in a block-based sparse backup image.

After the backup image has been mounted, the backup and restore software 205 may display a graphical user interface that allows the user to browse through the files and directories that were backed up to the backup image. Suppose for example that the user attempts to access a particular directory, e.g., in order to view the files in the directory. The backup and restore software 205 may send a request directed to the file system software 904 for a listing of the files in the directory. The file filter driver 902 may intercept the request and process the request as illustrated in FIG. 6.

As indicated in 331, the file filter driver 902 receives the request from the application (e.g., from the backup and restore software 205) to access the particular directory. In some embodiments the file filter driver 902 may first check to determine whether the specified directory is actually present in the backup image. If not present, the file filter driver 902 may return an error, e.g., a "directory not found" error, as indicated in 333. Otherwise, the file filter driver 902 may forward the request to the file system software 904, as indicated in 335.

The file system software 904 may access the directory structure for the specified directory that is stored in the backup image in order to obtain a listing of all the files in the directory. As discussed above, the directory structure may include entries for all of the files that were in the directory in the original volume from which the backup image was created, but the data blocks for one or more of the files may not have been backed up to the volume, since one or more of the files may not have matched the backup criteria or rule set (e.g., file name or file location criteria) specified by the user. Thus, the listing of files obtained from the directory structure may not reflect the files that are actually present in the backup image.

The file system software 904 may return the listing of files to the file filter driver 902. As indicated in 336, the file filter driver 902 receives the listing of files from the file system software 904. As indicated in 339, the file filter driver 902 may then filter out any files that are not actually present in the backup image, e.g., may remove the names of these files from the directory listing. The file filter driver 902 may then return the filtered directory listing to the application (e.g., to the backup and restore software 205).

As an example of the method of FIG. 6, consider the backup image 240 illustrated in FIG. 3. If the backup and restore software 205 requests to access the directory A represented by the directory structure 52A then the file system software 904 may return a file listing indicating that the files 55A, 55B, 55C, and 55D are present in the directory since the directory structure 52A includes entries for all four of these files. However, since the backup image 240 includes only the data blocks for the files 55A and 55D, but not for the files 55B and 55C, the file filter driver 902 may remove the names of the files 55B and 55C from the directory listing before returning the directory listing to the backup and restore software 205. Thus, when the backup and restore software 205 displays the list of files that are in the directory A, only the names of the files 55A and 55D may be displayed. The user may then select one or both of these files for restoration, and the backup and restore software 205 may communicate with the file system software 904 to read the selected file(s) and copy it to the target volume.

As another example, the user may attempt to restore a file from the backup image by directly typing in the full pathname of the file. Suppose for example that the user specifies the pathname of the file 55C that was in the original volume 230 of FIG. 3. Although the directory structure 52A includes a directory entry for the file 55C, the data blocks for the file 55C are not actually present in the backup image 240. Although it may appear to the file system software 904 that the directory entry for the file 55C references valid data blocks, an error may result if the file system software 904 attempts to actually access these non-existent data blocks. Thus, the file filter driver 902 may intercept requests by the backup and restore software 205 (or other applications) to access particular files and determine whether the particular files are actually present before passing the requests on to the file system software 904. In this example, the file filter driver 902 may determine that the file 55C is not actually present and may block the request to access the file 55C, e.g., by returning a "file not found" error.

In other embodiments, applications other than the backup and restore software 205 may access the files in a sparse backup image. For example, an operating system may provide a file browser application that implements a graphical user interface that allows a user to browse through files, such as the Windows™ Explorer application. The sparse backup image may be mounted for access, and the file filter driver 902 may be installed. The file filter driver 902 may then filter the requests and responses when the file browser application accesses the files and directories in the sparse backup image, similarly as described above. Thus, to the file browser application or other applications, a mounted sparse backup image may appear to be a normal file system volume.

In various embodiments the file filter driver 902 may use various techniques to determine whether particular files are actually present in the backup image. For example, as mentioned above, in some embodiments the backup image may include the information or rule set which specified the subset of files to backup from the original volume. Thus, the file filter driver may determine whether specific files are in the backup image using the information or rule set. For example, if the user specified that only files having a file name with an extension of ".txt" be backed up then the backup image may include this naming criteria. Thus, when the file filter driver 902 receives a directory listing from the file system software 904, the file filter driver 902 may simply filter out any file that does not have an extension of ".txt".

In other embodiments the file filter driver 902 may determine whether a particular file or directory is in the backup image by checking to see whether the blocks for the particular file or directory were captured in the backup image. For example, as noted above, in some embodiments the bitmap that specified the subset of blocks copied into the backup image may be stored in the backup image. Thus, the file filter driver 902 may check the bitmap to determine whether the bits corresponding to the blocks for the particular file or directory are set to 1.

Figure 7:
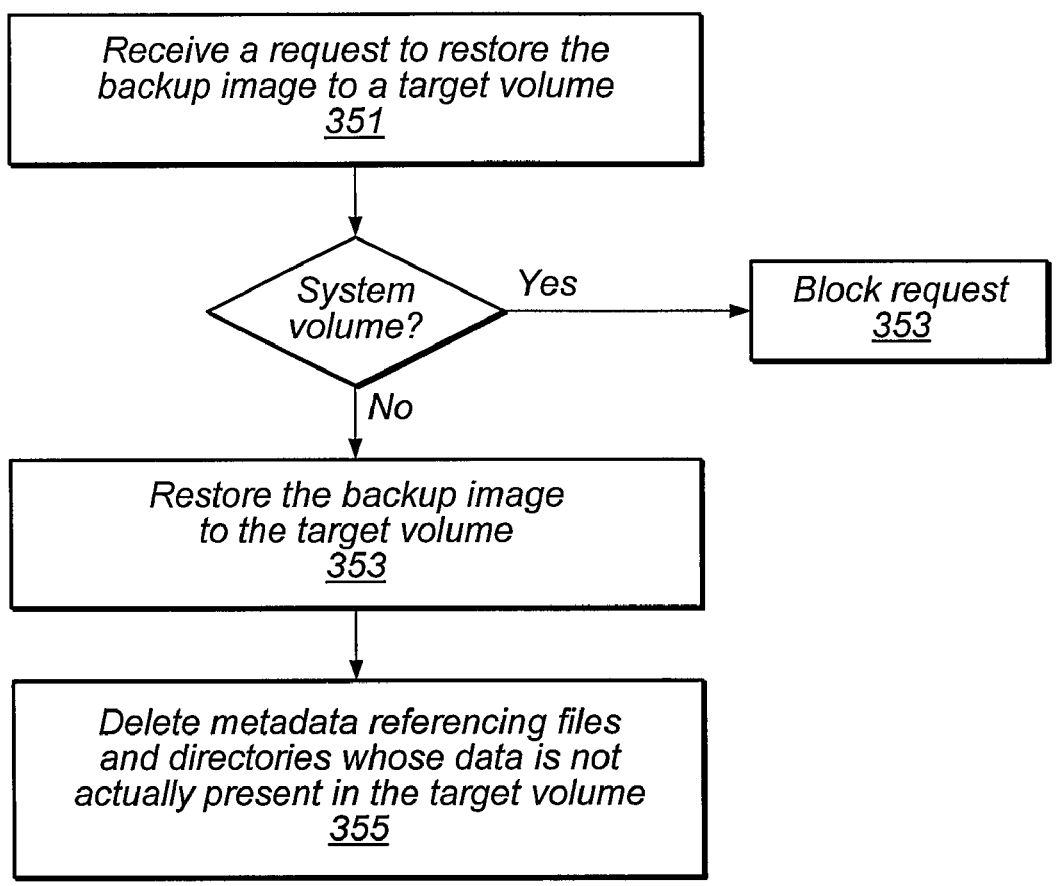
FIG. 7 is a flowchart diagram illustrating one embodiment of a method for restoring an entire block-based sparse backup image to a target volume.

The above-described method may be useful for restoring individual files from a block-based sparse backup image. However, in some cases the user may desire to restore the entire backup image to a target volume. FIG. 7 is a flowchart diagram illustrating one embodiment of a method for restoring an entire block-based sparse backup image to a target volume. The method may be implemented by software, e.g., the backup and restore software 205 executing on the host computer 82.

As indicated in 351, the backup and restore software 205 may receive a request to restore the backup image to a target volume. For example, the backup and restore software 205 may provide a graphical user interface that enables the user to either select an existing volume to overwrite or to specify a new volume to be created.

In some embodiments, if the user specified an existing volume to overwrite then the backup and restore software 205 may check to determine whether the specified target volume is a system volume. If so, then the backup and restore software 205 may block the request to overwrite the system volume, as indicated in 351. For example, if the user created a sparse backup image containing only the files in a "My Documents" directory then the computer on which the system volume is stored would no longer boot properly if the system volume were overwritten with the sparse backup image, e.g., since the operating system files would be lost.

Also, in some embodiments, even if the specified target volume is not a system volume, the backup and restore software 205 may still warn the user that the backup image is a sparse backup image. For example, if the user attempts to restore the sparse backup image to the original volume from which the sparse backup image was created, the files in the original volume that were not backed up to the sparse backup image may be lost if the original volume is overwritten by the sparse backup image.

If the user still desires to overwrite the original volume with the sparse backup image, or if the user specified to restore the sparse backup image to a new target volume then the backup and restore software 205 may restore the backup image to the target volume, as indicated in 353. If the target volume already exists then the backup and restore software 205 may overwrite the existing target volume data with the data from the sparse backup image. Otherwise, the backup and restore software 205 may first allocate space for the target volume and then copy the data from the target volume into the appropriate block locations within the allocated space.

Thus, after the sparse backup image has been restored to the target volume, the target volume includes the metadata structures that were backed up from the original volume to the sparse backup image, as well as the data blocks for the files that were backed up to the sparse backup image. However, as discussed above, some of the metadata structures may reference non-existent files. For example, a particular directory structure may include one or more directory entries representing files that were not included in the sparse backup image. Thus, as indicated in 355, after restoring the sparse backup image to the target volume, the backup and restore software 205 may then traverse the metadata structures in the target volume and delete metadata referencing files and directories whose data blocks are not actually present in the target volume. For example, the backup and restore software 205 may traverse the directory hierarchy and, for each directory, may determine whether the files (or other directories) referenced by the directory's entries actually exist. Entries representing files or directories whose data blocks do not exist may be deleted. In some embodiments deleting these entries may also cause other metadata structures to be updated, such as file allocation tables or a master file table.

The above description refers to creating a block-based sparse backup image from a volume. In further embodiments, it may be desirable to subsequently create an incremental backup image based on the original sparse backup image, where the incremental backup image includes changed data blocks of the files that were backed up to the original sparse backup image, e.g., data blocks that have changed since the original sparse backup image was created.

Figure 8:
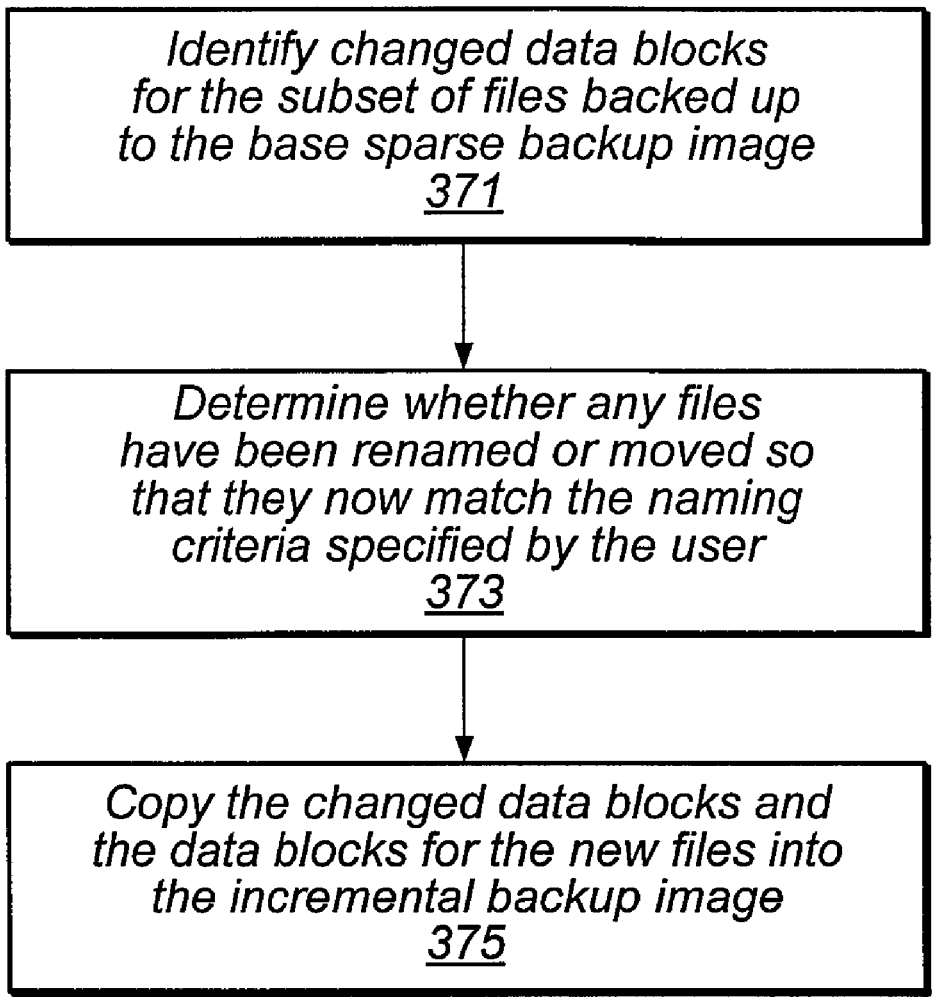
FIG. 8 is a flowchart diagram illustrating one embodiment of a method for creating a block-based incremental backup image based on an original block-based sparse backup image.

FIG. 8 is a flowchart diagram illustrating one embodiment of a method for creating a block-based incremental backup image based on an original block-based sparse backup image. The method may be implemented by software, e.g., backup and restore software 205 executing on the host computer system 82.

As indicated in 371, the backup and restore software 205 may identify the changed data blocks for the subset of files that were backed up to the original sparse backup image. (The original sparse backup image is also referred to herein as the base sparse backup image.) Thus, for each file in the subset of files backed up to the base sparse backup image, the backup and restore software 205 may identify which data blocks of the file (if any) have changed since the base sparse backup image was created. The identified changed data blocks need to be copied into the incremental backup image.

As discussed above, when the base sparse backup image was created, the user may have specified criteria identifying which files to include in the base sparse backup image, such as one or more directories to backup and/or naming criteria, such as all files having file names with a certain extension or containing a particular sub-string. It is possible that one or more of the files in the original volume that did not originally match the criteria specified by the user have been moved or renamed after the base sparse backup image was created, so that they now do match the criteria at the time the incremental backup image is created. For example, the user may have originally specified that only the files in a "My Documents" directory should be backed up, and may have subsequently moved one of the volume's files into the "My Documents" directory after the base sparse backup image was created. As another example, the user may have originally specified that only the files having a file name with an extension of ".doc" should be backed up, and may have subsequently renamed a file that originally had another extension so that it now has an extension of ".doc".

This, as indicated in 373, the backup and restore software 205 may determine whether any files have been renamed or moved so that they now match the naming or location criteria specified by the user. All of the data blocks for these files need to be copied into the incremental backup image.

As indicated in 375, the backup and restore software 205 may copy the changed data blocks identified in 371 and the data blocks for the new files identified in 373 into the incremental backup image.

Additional incremental backup images may be created in a similar manner. For example, after creating a first incremental backup image, the backup and restore software 205 may subsequently create a second incremental backup image based on the first incremental backup image. Thus, a chain of incremental backup images may be created.

In various embodiments any of various techniques may be used to identify the changed data blocks to copy into an incremental backup image and identify new files that need to be added to the incremental backup image. In some embodiments the backup and restore software 205 may use a bitmap, referred to as a Vdiff bitmap, which specifies which blocks of the volumes have changed since the previous backup image was created. The backup and restore software 205 may use the Vdiff bitmap to identify all of the volume directories that have changed since the previous backup image was created. The backup and restore software 205 may then determine which files in the changed directories match the rule set (i.e., match the location or naming criteria specifying which files to include in the base backup image), and may determine the data blocks for these files. From this information, the backup and restore software 205 may create a File Mapping (FM) bitmap identifying all of the data blocks of the files in the changed directories that match the rule set. The FM bitmap may be AND'ed with the VDiff bitmap to create a bitmap identifying the changed data blocks that need to be copied into the incremental backup image. (An AND operation is performed on each bit of the FM bitmap and the corresponding bit of the VDiff bitmap.) In addition, the backup and restore software 205 may also identify blocks of changed metadata structures that need to be copied into the incremental backup image, e.g., such as blocks of the file allocation tables or master file table.

The data blocks for new files that have been moved or renamed such that they now match the rule set specifying which files need to be backed up may be determined as follows. The backup and restore software 205 may first determine whether these data blocks are present in one or more of the previous backup images. This may be determined by checking the FM bitmap (excluding bits also set in the current Vdiff bitmap) against the Vdiff bitmap from each previous backup image up the image chain until the base backup image is reached. Any block corresponding to an FM bit not set in any of the Vdiff bitmaps has not changed since the base sparse backup image was created. If this block is present in the base sparse backup image, then it does not need to be captured in the current incremental backup image. Otherwise, the bit corresponding to the block in the current Vdiff bitmap will be set so that the block will be added to the current incremental backup image being created. Any FM bit that is also set in a previous Vdiff bitmap may also be checked to see if the corresponding block was captured in the incremental backup image corresponding to that Vdiff bitmap. If so, then the block was already captured. Otherwise the backup and restore software 205 may set the corresponding bit in the current Vdiff bitmap so that the block will be captured in the current incremental backup image.

In some embodiments the backup and restore software 205 may store a table of contents in each backup image. An alternative technique to identify the files that have been moved or renamed such that they now match the rule set specifying which files need to be backed up may use the table of contents, e.g., by simply comparing the table of contents of the previous backup image to the table of contents of the current backup image. Any file that was not listed in the previous table of contents but is in the current table of contents may have all of its blocks included in the current incremental backup image.

The methods described above may be used to create a block-based sparse backup image, e.g., in order to backup a subset of files of a volume. It may be advantageous to create a block-based sparse backup image rather than a complete block-based backup image of all the data in the volume for various reasons. For example, if the user only needs to backup certain important files rather than all the files in the volume, then a sparse backup image may be created instead of a complete backup image in order to reduce the amount of storage space required to store the backup image.

Another possible way to create a partial backup of a volume would be to backup the desired files on a file-by-file basis, rather than using a block-based backup technique. However, for some applications, it may be advantageous to create a block-based sparse backup image rather than using a file-by-file backup technique. For example, in some embodiments, performing a partial backup of a volume by creating a block-based sparse backup image may be faster then performing a partial backup on a file-by-file basis. For example, as discussed above, in some embodiments the data blocks from the original volume may be copied into the block-based sparse backup image in a single pass by traversing the blocks of the original volume according to their order on the hard disk. In contrast, individually backing up each file from the original volume on a file-by-file basis may require the read/write head of the hard disk to move back and forth multiple times, since the data blocks for the files may be fragmented and interspersed among each other. Thus, in some cases, it may be faster to create a block-based sparse backup image than to individually backup each file of the subset of files on a file-by-file basis.

It may also be advantageous to create a block-based sparse backup image for various other reasons. For example, prior art backup software typically creates full block-based backup images that mirror the complete volume. A full block-based backup image may be very large, e.g., depending on the size of the volume. For example, if the volume has 100 GB of data then a chain of one full block-based backup image and two incremental backup images may typically require about 200 GB of storage space. This large amount of required storage space may be problematic for some users that have only a limited amount of storage space. For example, consider a laptop computer user. The user may sometimes connect the laptop to a network where the backup images can be stored. However, the user may often use the laptop in other locations where it is disconnected from the network. The laptop may not have enough storage space to store the chain of backup images locally. Thus, the backup images may not be available to restore files in the event that it becomes necessary to do so when the user is not connected to the network.

It may be useful to create a sparse backup image to help alleviate the problem described above. When the volume of the laptop is originally backed up, the backup and restore software may create both a full block-based backup image and a block-based sparse backup image. The full block-based backup image may be moved to the network or an external storage device so that it is not stored locally on the laptop. The sparse backup image may remain stored locally on the laptop. The sparse backup image may include only the most important files which the user needs to backup, or the files that the user is most likely to need to restore in the future.

When an incremental backup image is subsequently created, the backup and restore software may create a single incremental that contains any block that would have been captured in either a normal incremental image or a sparse incremental image. In other words, the created incremental image will capture all the modified blocks that are still in use (as would be captured in a normal incremental), as well as blocks associated with any files that were renamed or moved to match the rule set for the sparse backup image. In most cases, no files will have been renamed or moved, so the resulting incremental image will be the same size as a normal incremental backup image.

The incremental backup images can use either the full backup image or the sparse backup image as their parent. The incremental backup images may initially be stored on the laptop, so the laptop user can use them to restore individual files matching the rule set for the sparse backup image. Since the incremental backup images are typically only a smaller percentage of the size of a full backup image, the required storage space on the laptop for these incremental backup images is less likely to be a problem. When the laptop subsequently re-connects to the network, the incremental backup images may be copied over to the network, where they can be stored along with the full base backup image. Thus, a full system restore to a particular point in time is also possible from the backup images stored on the network.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-vola- tile memory (e.g. Flash memory) accessible via a peripheral interface such as the Universal Serial Bus (USB) interface, etc. In some embodiments the computer(s) may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer-accessible storage medium storing program instructions executable to:
receive user input selecting a subset of at least two files, but not all files, of a volume to be backed up, wherein the volume includes a plurality of blocks, wherein the plurality of blocks includes a respective set of data blocks for each file of the volume and blocks of file system metadata structures for the volume, wherein the volume includes a first directory, wherein the first directory includes a plurality of files, wherein the plurality of files of the first directory includes a first one or more files included in the selected subset of files and a second one or more files not included in the selected subset of files;
in response to receiving the user input selecting the subset of files, copy a subset of the plurality of blocks of the volume into a backup image, wherein copying the subset of blocks includes copying each data block for each file of the selected subset of files without copying data blocks for files not in the selected subset of files, wherein data blocks for the first one or more files of the first directory are copied into the backup image, wherein data blocks for the second one or more files of the first directory are not copied into the backup image;
wherein said copying the subset of blocks further includes copying blocks of one or more file system metadata structures needed for accessing the selected subset of files, wherein copying the blocks of the one or more file system metadata structures includes copying blocks of a first directory structure corresponding to the first directory, wherein copying the blocks of the first directory structure includes copying blocks representing respective directory entries for each of the plurality of files of the first directory;
wherein the program instructions are further executable to:
after said copying the subset of blocks into the backup image, receive a request directed to the backup image for a list of files in the first directory; and
in response to the request:
determine a list including each file of the plurality of files of the first directory;
for each respective file of the second one or more files whose data blocks were not copied into the backup image, filter the respective file from the list; and
return information indicating the filtered list of files in response to the request.

2. The computer-accessible storage medium of claim 1, wherein the volume is stored on a disk drive;
wherein each block of the plurality of blocks is stored on a corresponding sector of the disk drive.

3. The computer-accessible storage medium of claim 1, wherein the subset of blocks are ordered on a storage device;

wherein copying the subset of blocks into the backup image comprises copying the subset of blocks into the backup image according to their order on the storage device.

4. The computer-accessible storage medium of claim 1, wherein prior to copying the subset of blocks into the backup image, the program instructions are further executable to store respective information for each respective block of the plurality of blocks of the volume, wherein the respective information for each respective block of the volume indicates whether the respective block should be copied into the backup image;

wherein the respective information for each block of the subset of blocks indicates that the block should be copied into the backup image.

5. The computer-accessible storage medium of claim 1, wherein the one or more file system metadata structures include one or more of:
   a master file table;
   a file allocation table;
   a boot sector.

6. The computer-accessible storage medium of claim 1, wherein copying the subset of blocks into the backup image backs up the selected subset of files to the backup image, wherein the files of the volume include a first file not in the subset of files;

wherein the program instructions are further executable to:
   mount the backup image as a second volume;
   intercept a request directed to the second volume, wherein the request comprises a request to access the first file; and
   block the request to access the first file.

7. The computer-accessible storage medium of claim 1, wherein the program instructions are further executable to:
   receive a request to restore the backup image to a target volume of a computer system; and
   block the request in response to determining that the target volume is a system volume.

8. The computer-accessible storage medium of claim 1, wherein the program instructions are further executable to:
   restore the backup image to a target volume of a computer system, wherein restoring the backup image includes copying the first directory structure into the target volume by copying the blocks of the first directory structure from the backup image into the target volume; and
   for each respective directory entry corresponding to a respective file of the second one or more files of the first directory whose data blocks were not copied into the backup image, deleting the respective directory entry from the first directory structure in the target volume.

9. The computer-accessible storage medium of claim 1, wherein the selected subset of files includes a first file;
wherein the backup image is a first backup image;
wherein after copying the subset of blocks into the first backup image, the program instructions are further executable to:
   determine that one or more of the data blocks of the first file have changed; and
   copy the one or more changed data blocks of the first file into a second backup image.

10. A system comprising:
one or more processors; and
memory storing program instructions, wherein the program instructions are executable by the one or more processors to:

receive user input selecting a subset of at least two files, but not all files, of a volume to be backed up, wherein the volume includes a plurality of blocks, wherein the plurality of blocks includes a respective set of data blocks for each file of the volume and blocks of file system metadata structures for the volume, wherein the volume includes a first directory, wherein the first directory includes a plurality of files, wherein the plurality of files of the first directory includes a first one or more files included in the selected subset of files and a second one or more files not included in the selected subset of files;

in response to receiving the user input selecting the subset of files, copy a subset of the plurality of blocks of the volume into a backup image, wherein copying the subset of blocks includes copying each data block for each file of the selected subset of files without copying data blocks for files not in the selected subset of files, wherein data blocks for the first one or more files of the first directory are copied into the backup image, wherein data blocks for the second one or more files of the first directory are not copied into the backup image;

wherein said copying the subset of blocks further includes copying blocks of one or more file system metadata structures needed for accessing the selected subset of files, wherein copying the blocks of the one or more file system metadata structures includes copying blocks of a first directory structure corresponding to the first directory, wherein copying the blocks of the first directory structure includes copying blocks representing respective directory entries for each of the plurality of files of the first directory;

wherein the program instructions are further executable by the one or more processors to:
   after said copying the subset of blocks into the backup image, receive a request directed to the backup image for a list of files in the first directory; and
   in response to the request:
      determine a list including each file of the plurality of files of the first directory;
      for each respective file of the second one or more files whose data blocks were not copied into the backup image, filter the respective file from the list; and
      return information indicating the filtered list of files in response to the request.

11. A method comprising:
receiving user input selecting a subset of at least two files, but not all files, of a volume to be backed up, wherein the volume includes a plurality of blocks, wherein the plurality of blocks includes a respective set of data blocks for each file of the volume and blocks of file system metadata structures for the volume, wherein the volume includes a first directory, wherein the first directory includes a plurality of files, wherein the plurality of files of the first directory includes a first one or more files included in the selected subset of files and a second one or more files not included in the selected subset of files;

in response to receiving the user input selecting the subset of files, copying a subset of the plurality of blocks of the volume into a backup image, wherein copying the subset of blocks includes copying each data block for each file of the selected subset of files without copying data blocks for files not in the selected subset of files, wherein data blocks for the first one or more files of the first directory are copied into the backup image, wherein data blocks for the second one or more files of the first directory are not copied into the backup image;

wherein said copying the subset of blocks further includes copying blocks of one or more file system metadata structures needed for accessing the selected subset of files, wherein copying the blocks of the one or more file system metadata structures includes copying blocks of a first directory structure corresponding to the first directory, wherein copying the blocks of the first directory structure includes copying blocks representing respective directory entries for each of the plurality of files of the first directory;

wherein the method further comprises:
- after said copying the subset of blocks into the backup image, receiving a request directed to the backup image for a list of files in the first directory; and
- in response to the request:
  - determining a list including each file of the plurality of files of the first directory;
  - for each respective file of the second one or more files whose data blocks were not copied into the backup image, filtering the respective file from the list; and
  - returning information indicating the filtered list of files in response to the request.

12. The system of claim 10,
wherein the subset of blocks are ordered on a storage device;
wherein the program instructions are executable by the one or more processors to copy the subset of blocks into the backup image according to their order on the storage device.

13. The system of claim 10,
wherein prior to copying the subset of blocks into the backup image, the program instructions are further executable by the one or more processors to store respective information for each respective block of the plurality of blocks of the volume, wherein the respective information for each respective block of the volume indicates whether the respective block should be copied into the backup image;
wherein the respective information for each block of the subset of blocks indicates that the block should be copied into the backup image.

14. The method of claim 11,
wherein the subset of blocks are ordered on a storage device;
wherein the subset of blocks are copied into the backup image according to their order on the storage device.

15. The method of claim 11, further comprising:
prior to copying the subset of blocks into the backup image, storing respective information for each respective block of the plurality of blocks of the volume, wherein the respective information for each respective block of the volume indicates whether the respective block should be copied into the backup image;
wherein the respective information for each block of the subset of blocks indicates that the block should be copied into the backup image.

* * * * *